United States Patent
Lindner

(10) Patent No.: US 7,059,959 B2
(45) Date of Patent: Jun. 13, 2006

(54) CLOSURE FOR AT LEAST ONE OPENING

(75) Inventor: Björn Lindner, Troy, MI (US)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/876,771

(22) Filed: Jun. 28, 2004

(65) Prior Publication Data

US 2005/0048910 A1   Mar. 3, 2005

(30) Foreign Application Priority Data

Jun. 26, 2003   (DE) .................... 103 28 963

(51) Int. Cl.
*B60H 1/26* (2006.01)

(52) U.S. Cl. .................... 454/152; 49/118; 160/221

(58) Field of Classification Search ........... 160/118, 160/221; 49/370, 118; 454/121, 152, 156, 454/160, 161
See application file for complete search history.

(56) References Cited

U.S. PATENT DOCUMENTS

| | | | | |
|---|---|---|---|---|
| 2,831,448 A * | 4/1958 | Suderow ................ 114/202 |
| 4,258,616 A * | 3/1981 | Zeller et al. ............. 454/303 |
| 4,570,533 A | 2/1986 | Sugawara et al. |
| 4,947,735 A | 8/1990 | Guillemin |
| RE37,985 E * | 2/2003 | Felsen ................... 454/303 |
| 2001/0027861 A1* | 10/2001 | Tsurushima et al. ....... 165/201 |

FOREIGN PATENT DOCUMENTS

| DE | 72 33 793 U1 | 4/1973 |
|---|---|---|
| DE | 34 37 259 C2 | 5/1985 |
| DE | 39 16 387 A1 | 12/1989 |
| DE | 195 16 288 A1 | 11/1996 |
| DE | 199 10 774 A1 | 9/2000 |
| EP | 0 324 770 B1 | 6/1991 |

\* cited by examiner

*Primary Examiner*—Gregory Wilson
(74) *Attorney, Agent, or Firm*—Foley & Lardner LLP

(57) ABSTRACT

Closure for closing one or more openings (O) of an air-conditioning system, in particular ducts or air-guiding elements that form part of an air-conditioning system. The closure (1) has a plurality of closing elements (3a to 3z) that are arranged (when viewed in a common displacement direction (V)) essentially in one plane (P), so as to be displaceable in parallel with one another, either together in the same direction and/or in opposite directions with respect to one another, in the displacement direction (V).

21 Claims, 3 Drawing Sheets

CLOSURE FOR AT LEAST ONE OPENING

CROSS-REFERENCE TO RELATED PATENT APPLICATIONS

The right of foreign priority under 35 U.S.C. §119(a) is claimed based on Federal Republic of Germany Priority Application 103 28 963.1, filed Jun. 26, 2003, the entire disclosure of which, including the specification, drawings, claims and abstract, is incorporated herein by reference.

BACKGROUND OF THE INVENTION

The invention relates to a closure for at least one opening of an air-conditioning system, in particular for closing one or more openings of the air-conditioning system, for example, openings of a duct or air-guiding element that is assigned to the air-conditioning system.

Air-conditioning systems are being used increasingly widely owing, for example, to the increased comfort levels in automobiles that are becoming the standard. In such systems, for example, air from the surroundings or fresh air is fed from the outside to the air-conditioning system through ducts or air-guiding elements. This air is adjusted to a desired temperature by mixing with warm air in the air-conditioning system, for example, in a mixing chamber. When the fresh air or external air is set to the desired temperature, it is fed into an internal space through ducts. In order to control or regulate the airflow to, in and/or from the air-conditioning system and also to direct it in specific directions, openings to and from the air-conditioning system are provided at outlets of the ducts and in the air-conditioning system itself. Such openings are usually each provided with a closure.

So-called as vane closing elements, closing elements with one or more joints or shutters or shutter cartridges, are generally used as the closure. By means of the closure, which brings about a change in the opening cross section by changing the position of the closure, the airstream that is fed through the opening is controlled or directed from and/or to the air-conditioning system, or also in the air-conditioning system itself.

In this regard, a separate associated closing element (also referred to as door) is usually assigned for each opening. However, sometimes only one closing element is also provided for two openings or outlets. In such a context, each closing element is usually activated separately, i.e., an actuation element or an adjustment device is assigned to each closing element.

Furthermore, the closures from the prior art each comprise a joint by means of which the closure or its segments are moved, so that a specific space is required for movement. Consequently, a relatively large installation space must be provided. In this regard, when there is such a movement—guided about a joint or axle—of the closing element, there is also a change in direction of the airstream that is guided through the opening. It is particularly disadvantageous here that, as a result of the articulated arrangement of the closing elements or segments, the mixing chambers in the air-conditioning system that are provided for conditioning the air do not have a constant volume, so that an approximately constant value can be set only with a relatively large degree of effort and complex control and regulating functions.

SUMMARY OF THE INVENTION

It is therefore one object of the present invention to provide a closure, for at least one opening, preferably for a vehicle air-conditioning system.

A further object of the invention is to provide such a closure that has a particularly simple, compact and versatile design and can be easily controlled.

In accomplishing one or more of these objects, there has been provided, in accordance with one aspect of the invention, a closure for an opening for an air-conditioning system, comprising an air-guiding element forming an air passageway having an opening; a plurality of essentially planar closing elements that are displaceably positioned essentially in a single plane, in a manner such as to be displaceable essentially within said plane and parallel to one another, so as to selectively open and close at least one portion of said opening; and a displacement mechanism for displacing the closing elements with respect to one another, either in the same direction or in opposite directions.

In accordance with another aspect of the invention, there has been provided a method for selectively opening and closing an opening in an air passageway of an air-conditioning system, comprising: selectively moving in a plane intersecting the opening at least one of a plurality of essentially planar closing elements that are displaceably positioned in essentially a single plane, the at least one closing element being displaceable parallel to one or more of the plurality of closing elements.

Further objects, features and advantages of the invention will become apparent from the detailed description of preferred embodiments, when considered together with the accompanying figures of drawing.

BRIEF DESCRIPTION OF THE DRAWINGS

In the drawings.

Corresponding parts are provided in all figures with the same reference numerals.

DETAILED DESCRIPTION OF THE PREFERRED EMBODIMENTS

Figure 1:
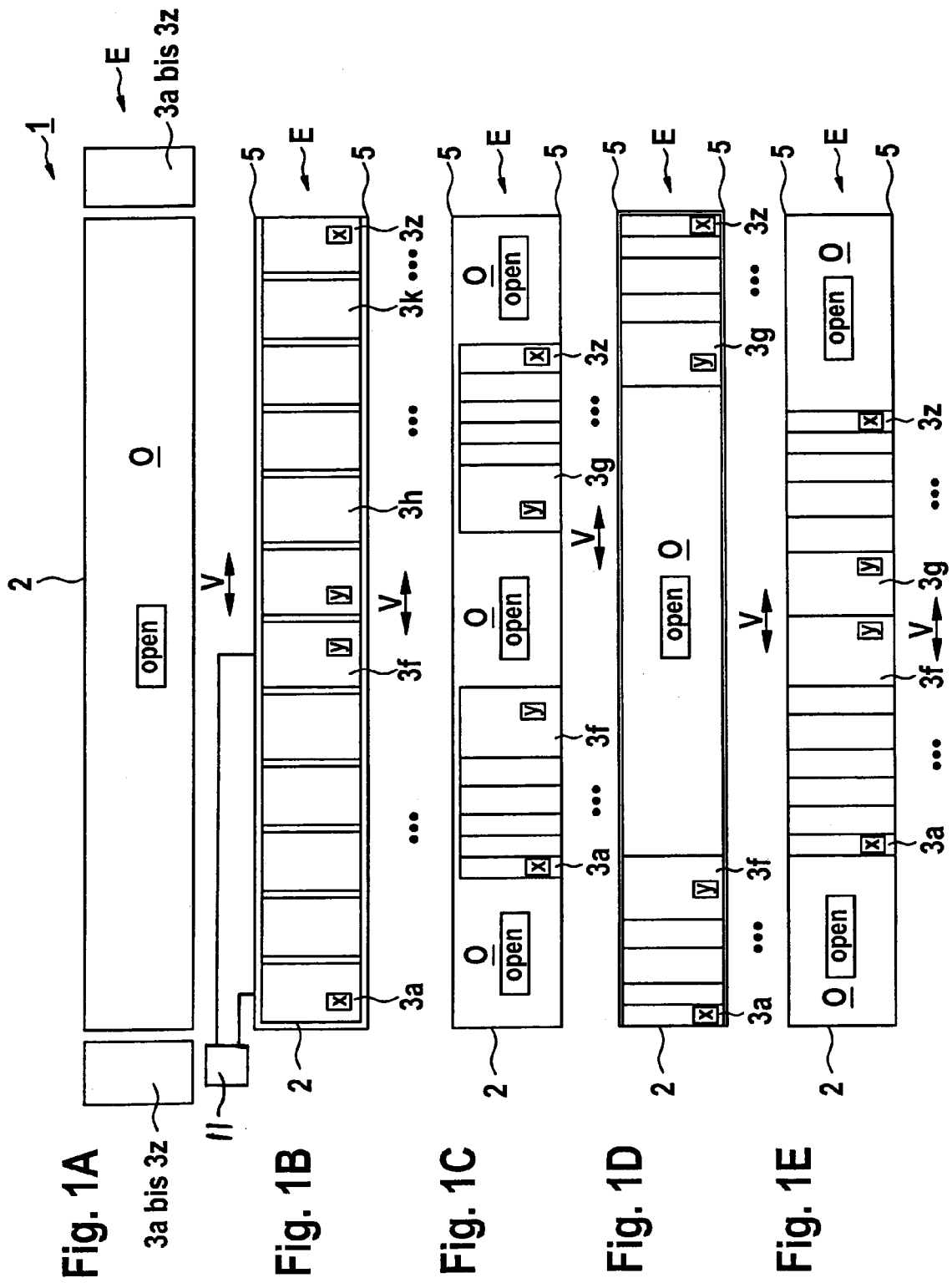
FIGS. 1A to 1E show a front view of the closure according to the invention in various closure positions.

The invention provides a closure for one or more openings, in particular for an air-conditioning system, comprising a plurality of planar closing elements that are arranged, viewed in the direction of a common displacement direction in one plane, so as to be displaceable in parallel with one another either together and/or with respect to one another in the common displacement direction.

As a result of such segmentation of the closure into a plurality of planar closing elements, for example, in the form of a plurality of blades or plates (lamellae) and their arrangement in a common displacement direction of the opening so that they can be displaced together and/or with respect to one another, the closing elements can be opened or closed partially or entirely. As a result of such a variable adjustment of the opening in order to condition the air of the passenger compartment, the comfort level in the vehicle for the occupants is increased by virtue of the fact that it is possible to set an individual airflow setting and/or temperature layering for individual requirements. As a result, the airflow that is to be guided through a large opening can be regulated or controlled particularly easily. For example, an individual airflow setting for wide dashboard openings in the vehicle can thus be achieved, and the individual comfort of vehicle occupants can be increased. Another result is that the mixing chambers in the air-conditioning system have an essentially constant volume. Due to the preferred arrangement of the closing elements in virtually a single plane, the closure requires only a very small installation space. That is to say the closure takes up only a small space that is essentially two dimensional. In addition, as a result of the closure according to the invention, the number of openings of the air-conditioning system, for example, in the passenger compartment, can be reduced, in the extreme case even to one opening.

For a particularly space-saving design of the closure having simultaneously simple and space-saving adjustment of its segments or elements, the closing elements are arranged offset with respect to one another, preferably perpendicularly with respect to the duct wall. In one preferred embodiment, adjacent closing elements are arranged so as to be displaceable together in the same direction and/or in opposite directions with respect to one another, in such a way that they engage one over the other. For example, the closing elements are arranged in such a way that they engage one over the other in the manner of a roof tile and can be moved together and/or with respect to one another.

For reliable and precise movement of the closing elements, the respective closing element is expediently displaceable in the displacement direction by a length that corresponds approximately to the width of the adjacent closing element. In other words, in order to close the opening, the closing elements are arranged in parallel with their entire width lying one next to the other in the plane in the displacement direction. As a result of the closing elements being arranged so that they are offset with respect to the plane and displaceable together and/or with respect to one another, they can be arranged so that they partially or entirely open the opening, in a position that at least partially covers the width of the respective adjacent closing element (overlaps) and consequently in such a way that they engage one over the other and can thus be arranged in parallel one over the other.

For a closure that seals, in particular with respect to an airstream, the respective closing element is advantageously also provided with a lip along at least part of an outer edge. Depending on the type and design, the lip can be preferably arranged along the edge bordering the adjacent closing element. Alternatively, the lip can completely surround the closing element. Alternatively or in addition, the respective closing element can be provided with a lip on the upper side and/or on the lower side. For example, a further closing element that is arranged between two closing elements is provided with a lip or seal on the upper side and lower side. In the case of a closing element that forms the edge of the closure, this closing element preferably has a lip only in the direction of the adjacent closing element. In order to support the guiding and displacement of the closing elements with respect to one another and/or together, the lip advantageously serves as a stop. That is to say, when the closing elements are displaced together and/or with respect to one another, the movement is bounded by the lips that serve as a stop so that the respective closing element can be displaced only a certain maximum determined by the width of the adjacent closing element.

In addition or alternatively, the at least one closing element can be guided in the displacement direction by means of at least one guide element. Depending on the type and design of the closure, it may be sufficient here that, viewed in the displacement direction, at least the first and the last closing element are arranged so as to be displaceable in a guide element. In one particularly simple embodiment, the guide element is arranged above and/or below the respective closing element.

In order to support the closing function of the closure, in particular in order to open and close the opening simply and quickly, at least one of the closing elements is arranged so as to be displaceable by means of the adjustment device. The adjustment device is preferably driven manually or by a motor. For this purpose, the adjustment device expediently comprises a spindle or a toothed belt that engages with and interacts with the respective closing element. In order to guide all the closing elements securely with a simultaneously small amount of effort, an adjustment device is respectively assigned to the first and last closing element viewed in the displacement direction. As a result, merely adjusting the last closing element makes it possible to adjust the closing elements that are directly connected to and adjacent to the last closing element, by virtue of their being arranged in such a way that they engage in one another and one over the other. Depending on the specifications, a plurality of closing elements whose edge-side closing elements are each preferably provided with an adjustment device can be combined to form one adjustable group segment. By means of such a grouping of closing elements it is possible to create and adjust a plurality of airflow openings within one opening, in a particularly simple and space-saving way as well as reliably and quickly. When the opening to be closed is particularly large, an adjustment device is expediently assigned to every second closing element, viewed in the displacement direction.

Turning now to the drawings, FIGS. 1A to 1E each show a closure 1 for closing an opening O of a conventional air-conditioning system (not illustrated in more detail), for example, an opening O of an air-guiding element 2 of the air-conditioning system. The opening O is arranged in this instance, for example, in a dashboard of a vehicle and formed by the end of the air-guiding element 2 or a duct that extends as far as an air-conditioning unit (not illustrated in detail) and directs conditioned air from the air-conditioning system into the passenger compartment of the vehicle. The closure 1 can be arranged directly at the inlet of the duct (near the air-conditioning unit) and/or at the outlet of the air-guiding element 2. Furthermore, the closure 1 can also be arranged at an intermediate point in the air-guiding element 2 and can close it or open it so that, for example, a fresh air mode or recirculated air mode can be set, in order to feed external air or internal air (recirculated) to the air-conditioning system by means of an appropriate position of the closure 1. In other words, the closure 1 can also alternatively or additionally be arranged inside of the air-guiding element 2, in the same manner as a flap, to provide an arrangement that is insensitive to external influences, for example, dirt or rain. In addition, the closure 1 can also be arranged in an air-conditioning unit itself, for example, in order to open or close a mixing chamber in the air-conditioning unit.

In order to close or open the opening O, the closure 1 comprises a plurality of closing elements 3$a$ to 3$z$ that are arranged, when viewed in the direction of a common displacement direction V (direction of arrow) in a plane P, so as to be displaceable in parallel with one another, either together in the same direction and/or in opposite directions with respect to one another, i.e., from left to right or vice versa, in the displacement direction V. For example, lamela-like, particularly planar elements, for example, thin metal or plastic plates or sheets, are preferably used as the closing elements $3a$ to $3z$. These are preferably plastic elements that either have guide elements or control elements formed at the top and bottom and/or interact with such elements on the housing; see FIG. $3a$, $3b$ or $3c$. Furthermore, sealing lips, stop elements or engaging devices may be provided, integrally formed on by injection molding, for example.

In FIG. 1$a$, the opening O is completely opened. Here, the closing elements $3a$ to $3z$ are located at the edge of the opening O, when viewed in the displacement direction V. They are preferably arranged in parallel, one over the other (stacked). Due to the planar design of the closing elements $3a$ to $3z$, they can be positioned in a particularly space-saving way. Depending on the type and design of the closing elements $3a$ to $3z$, they can be arranged only on one side or on both sides of the opening O, when in the open position. When the closing elements $3a$ to $3z$ are positioned on only one side, all the closing elements $3a$ to $3z$ are positioned on one side of the opening O, when in the open position. Alternatively, the closing elements $3a$ to $3z$ can be divided into groups, with a first group being positioned on one side of the opening O, and a second group being positioned on the other opposite side of the opening O.

Depending on the position of the closing elements $3a$ to $3z$ of the closure 1, an opening 2 that lies in the plane P can thus be completely opened (FIG. 1A) or completely closed (FIG. 1B) or partially opened (and therefore also partially closed) (FIGS. 1C to 1D). In this regard, the closing elements $3a$ to $3z$ in the completely closed position (FIG. 1B) are arranged in parallel, one next to the other essentially in the plane P. Displacing individual closing elements $3a$ to $3z$, either element-by-element or in groups, makes possible various open positions, e.g., having a large opening O (FIG. 1A), having three smaller openings O (FIG. 1C), including a central opening O (FIG. 1D) or having two edge-side openings O (FIG. 1E). That is to say, the respective openings O are separated or surrounded by closed sections, and the closed sections are formed by correspondingly positioning the closing elements $3a$ to $3z$. For this purpose, the closing elements $3a$ to $3z$ are preferably divided into a plurality of groups G1 and G2. Here, a first group G1 comprises a plurality of associated closing elements $3a$ to $3f$, and a second group G2 comprises associated closing elements $3g$ to $3z$. By displacing the groups G1 and/or G2 of the closing elements $3a$ to $3f$ and $3g$ to $3z$, the various open positions of the opening O shown in FIGS. 1A to 1E, having one or more partial openings, can be set. In order to set the opening O as quickly and easily as possible, the closing elements $3a$ to $3f$ and $3g$ to $3z$ (that are combined to form a group G1 or G2) are arranged so as to engage in one another in such a way that, by displacing the respective first and/or last closing element $3a$ or $3g$ and $3f$ or $3z$, the adjacent closing elements $3b$ to $3e$ and $3h$ to $3y$ can be displaced together and/or with respect to one another. In other words, the closing elements $3a$ to $3z$ are moved, in particular displaced, in a way similar to a harmonica.

For this purpose, according to one embodiment the closing elements $3a$ to $3z$ are displaceably arranged in a guide element 5. Depending on the type and design of the closure 1, it is also possible to arrange, and thus guide, all the closing elements or a plurality of the closing elements $3a$ to $3z$ that are combined to form the group G1 or the group G2, in a common or separate guide element 5. Depending on the size of the opening O to be closed, a plurality of guide elements 5 can also be provided. In one preferred embodiment, in each case a guide element 5 is arranged above and below each of the closing elements $3a$ to $3z$. In this case, the guide element 5 extends in the longitudinal direction in the displacement direction V and is embodied, for example, as a groove or an at least partially closed duct 7, in the manner of a housing 9, as illustrated in detail in FIG. 2.

Figure 2:
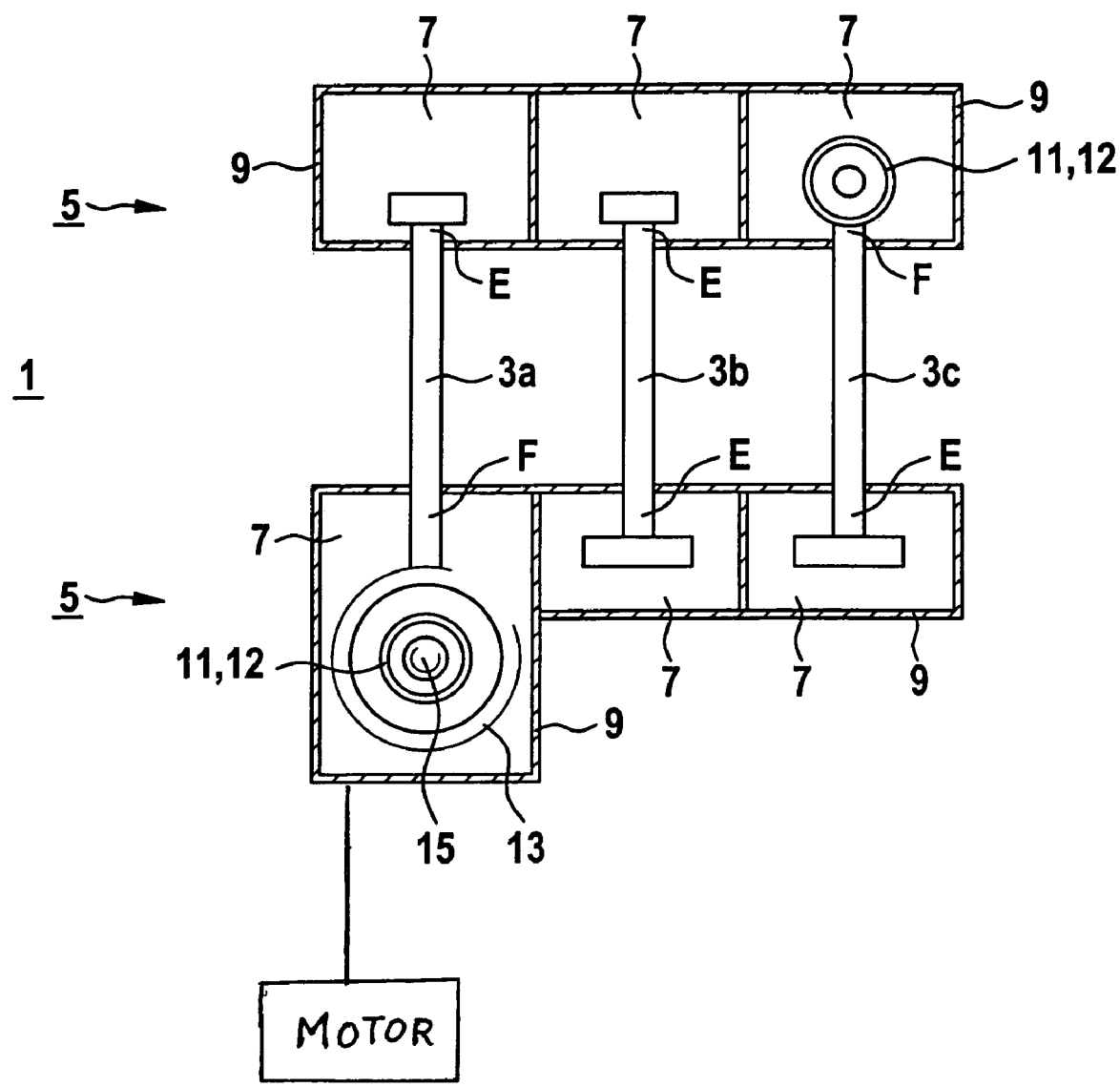
FIG. 2 shows the closure in FIG. 1 in cross-section.

FIG. 2 shows a cross section through a closure 1 with a plurality of closing elements $3a$ to $3c$ that are arranged with respect to one another in one position, for example, the closing elements $3a$ to $3c$ are arranged in a position that brings about an open setting of the opening O, as shown in FIG. 1A. Here, the closing elements $3a$ to $3c$ respectively extend above and below in the guide element 5, in which they are guided in order to close or open the opening O in the duct 7, that is embodied in this case as a hollow section. Depending on the type and function of the respective closing element $3a$ to $3c$, they are embodied as a passive closing element $3b$ or as an active closing element $3a$ or $3c$. A passive closing element $3b$ is to be understood here as a closing element $3b$ that can be displaced passively (indirectly together) with the adjacent closing elements $3a$ or $3c$, e.g., as a result of being arranged in such a way that they engage one another. In contrast, active closing elements $3a$ or $3c$ are provided with an adjustment device 11 that actively (directly) brings about displacement of the respective closing element $3a$ or $3c$ as well as of the passive closing elements $3b$ that are connected to it, i.e., by being arranged in such a way that they engage one another.

In this regard, the passive closing elements $3b$ preferably have essentially identical ends E that are guided in the guide element 5. The active closing elements $3a$ or $3c$, that form in particular a first or a last closing element $3a$, $3g$ or $3f$, $3z$ of a group G1 or G2 according to FIG. 1, have (in the direction of the next and adjacent closing element $3b$) an essentially identical end E to that of the passive closing elements $3b$. On the opposite end F, that is thus free, the respective active closing element $3a$ or $3c$ is provided with the adjustment device 11. The ends E and F of the closing elements $3a$ and $3c$ that are guided in the guide element 5, and their accommodation, arrangement and guiding in the guide element 5 are constructed in a mirror-symmetrical fashion.

The housing 9 additionally serves to seal the closing elements $3a$ to $3c$. In addition, the adjustment device 11 is preferably arranged in the housing 9. A spindle 12 serves, for example, as the adjustment device 11. The spindle 12 has an external thread 13 that interacts with an internal thread 15 in a cylindrical section on the lower free end F of the first closing element, $3a$ and at the upper free end F of the last closing element $3c$, respectively. In order to permit the largest possible width variation in positions of the closing elements $3a$ to $3c$, a plurality of adjustment devices 11 are preferably provided along the closure 1. The adjustment device 11 can be arranged, for example, exclusively at the lower end F of the first closing element $3a$, at the upper end F of the last closing element $3c$ or else at the lower and upper end F of both closing elements $3a$ and $3c$. In the case of a large opening O that is to be closed (as shown in FIGS. 1A to 1E), it is possible, for example, for every second closing element $3a$, $3c$, $3e$ etc. to be of active design and provided with an adjustment device 11.

By rotating the spindle 12 about its longitudinal axis (perpendicularly to the plane of the drawing), the closing elements $3a$ to $3c$ can be displaced in the guide elements 5. The adjustment device 11 can be driven either by a motor and/or manually. In an alternative embodiment, the adjustment device 11 comprises a toothed belt that interacts with gearwheels that are rotatably arranged on the active closing elements 3a or 3c, in order to displace the closing elements 3a to 3c in the displacement direction V, as described.

Figure 3A:
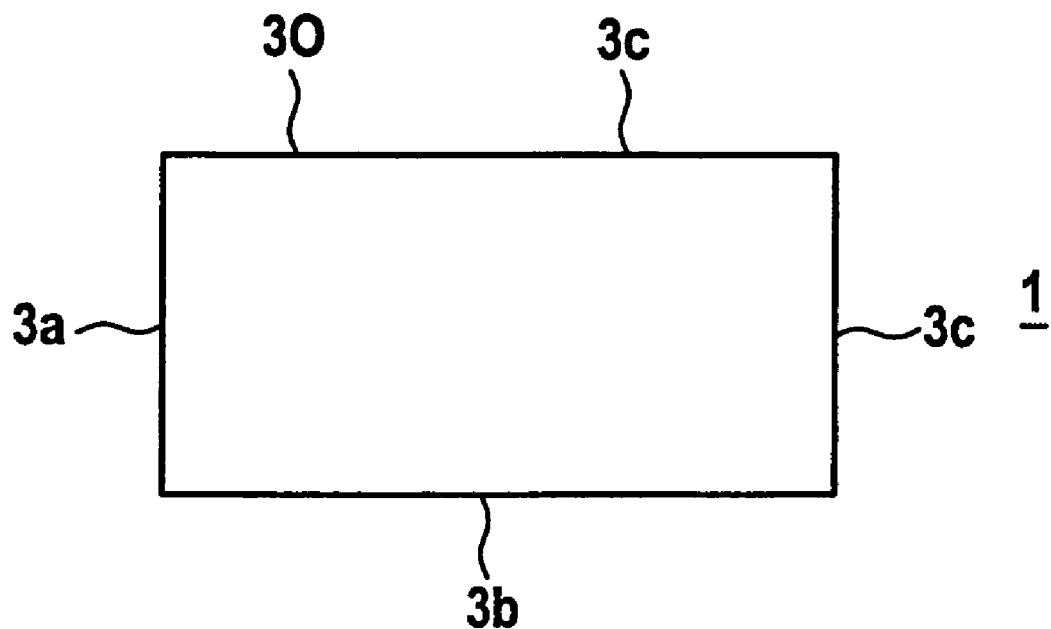
FIG. 3A shows an enlarged partial view of the closure in FIG. 1.
Figure 3B:
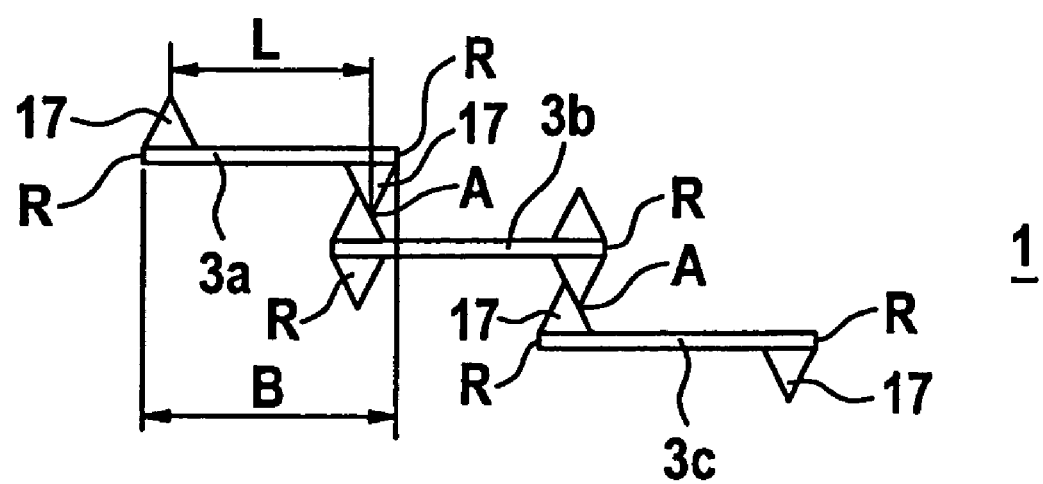
FIG. 3B shows an enlarged top view of some of the closure elements in FIG. 1, shown in a closed position.

FIG. 3A illustrates an enlarged partial view of FIG. 1B, and FIG. 3B illustrates a top view of the respective closing elements 3a to 3c in FIG. 3A.

The closing elements 3a to 3e have lips 17, such as sealing lips, which come to rest on lips 17 of adjacent closing elements 3a to 3c. For this purpose, lips 17 are arranged at least partially along an outer edge R of the closing elements 3a to 3c. In particular, the lips 17 of the respective closing element 3a to 3c are provided on the edge R, such as, for example, the sealing lip, bordering the nearest closing element 3a to 3c. Thus, a further closing element 3b, that is arranged between two closing elements 3a and 3c, is provided with lips 17 on both sides. Guides are provided on the upper and/or lower side and in turn form a seal. In contrast, the first and the last closing element 3a and 3c, respectively, are provided with a lip 17 in the direction of the adjacent closing element 3b, and with a further lip 17 facing the outer edge of the closure 1. It is possible to arrange these lips in a mirror inverted fashion on the edge R, as illustrated. Alternatively, these lips 17 can also be provided on only one side on the respective closing element 3a to 3c. This ensures that the closure 1 is "sealed" i.e., so that in the closed state of the closure 1 no air can pass into the passenger compartment of the vehicle through the closing elements 3a to 3c out of the air-guiding element 2, coming from the air-conditioning system.

In one advantageous embodiment of the closure 1, it is not the case that every closing element 3a to 3c interacts with the adjustment device 11, but rather, as explained above, for example, the first and/or the last closing element 3a or 3c, or every second closing element 3a, 3c etc. does so. In this embodiment, the lips 17 additionally act as a stop A: if the active closing elements 3a and 3c are moved, for example, displaced, the lips 17 of the active closing elements 3a and 3c strike against lips 17 of the passive closing elements 3b and thus move the passive closing elements 3b in the same direction as the active closing elements 3a and/or 3c. In other words, the respective closing element 3a to 3c can be displaced in the displacement direction V by a length L that corresponds approximately to the width B of the adjacent closing element 3a to 3c. The passive closing elements 3b thus always have a mechanical connection to active closing elements 3a or 3c in order to execute a common movement together and/or with respect to one another in the displacement direction V.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A closure for an opening of an air-conditioning system, comprising a motor vehicle heating/air-conditioning duct forming an air passageway having an opening; a plurality of essentially planar closing elements that are displaceably positioned essentially in a single plane, in a manner such as to be displaceable along a displacement direction essentially within said plane and parallel to one another, so as to selectively open and close at least one portion of said opening, wherein adjacent closing elements include a structural element that causes them to inter-engage one another in a manner such that displacement of a first adjacent closing element by a predetermined distance causes the second adjacent closing element to move together with the first adjacent closing element, and wherein each respective closing element includes at least one sealing lip on one of its planar surfaces, along each outer edge that is perpendicular to the displacement direction, for sealing adjacent closing elements against the passage of air in at least a position in which the adjacent closing elements close a portion of said opening; and a displacement mechanism for displacing the closing elements with respect to one another, either in the same direction or in opposite directions along the displacement direction.

2. A closure as claimed in claim 1, wherein the closing elements are arranged offset with respect to one another perpendicularly with respect to the plane.

3. A closure as claimed in claim 1, comprising a grouping of at least three adjacent closing elements that inter-engage with one another for movement such that they are positioned essentially completely over one another in a parallel overlapping relationship in an open condition of at least a portion of said opening.

4. A closure as claimed in claim 3, wherein said displacement mechanism is assigned to the first and last closing elements, viewed in the displacement direction, whereby the portion of the opening can be selectively opened and closed from either side or simultaneously from both sides of the opening.

5. A closure as claimed in claim 4, comprising a plurality of said groupings positioned in a single opening along the displacement direction, whereby the opening can be selectively opened and closed from either side or simultaneously from both sides of the opening, as well as selectively opened and closed at a point intermediate to the two sides of the opening.

6. A closure as claimed in claim 1, wherein the structural element provides that each respective closing element is displaceable in the displacement direction by a length that corresponds approximately to the width of the adjacent closing element.

7. A closure as claimed in claim 1, wherein said at least one sealing lip along each outer edge of each respective closing element comprises a first sealing lip positioned on a first side of the closing element at one edge and a second sealing element positioned on a second side of the closing element that is opposite to said first side.

8. A closure as claimed in claim 7, wherein at least one respective closing element comprises a sealing lip on the first side and also on the second side at each of said edges.

9. A closure as claimed in claim 1, wherein the at least one sealing lip serves as said structural element for both opening and closing the opening.

10. A closure as claimed in claim 1, further comprising at least one guide element for guiding a respective closing element in the displacement direction.

11. A closure as claimed in claim 10, wherein, viewed in the displacement direction, at least the first and the last displacement element are provided with a guide element.

12. A closure as claimed in claim 10, wherein the guide element is arranged above and/or below the respective closing element.

13. A closure as claimed in claim 1, wherein the displacement mechanism is driven by a motor.

14. A closure as claimed in claim 1, wherein the displacement mechanism comprises a spindle.

15. A closure as claimed in claim 1, wherein the displacement mechanism is arranged to selectively open and close the opening at a plurality of spaced locations that are separated from one another by at least the width of one of said closing elements.

16. A closure as claimed in claim 1, comprising at least four of said closure elements.

17. A method for selectively controlling the flow of conditioned air by opening and closing an opening in a motor vehicle air passageway duct of an air-conditioning system, comprising: selectively displacing, along a displacement axis and in a plane that extends essentially perpendicular to said air-conditioning duct and that intersects said opening, at least one of a plurality of essentially planar closing elements that comprise a grouping of said closing elements and that are displaceably positioned in essentially a single plane, said at least one closing element in said grouping being displaceable along the displacement axis parallel to one or more of said plurality of closing elements of the grouping, wherein there are at least three of said groupings arranged in said plane along said displacement axis, and wherein said selective displacing comprises selectively displacing along the displacement axis at least one of said closing elements in each of said groupings between a first position in which the opening is entirely closed and a second position in which at least a portion of said opening is open for flow of air.

18. A method as claimed in claim 17, comprising selectively displacing at least two of said closing elements in the same grouping parallel to one another in said plane, either in the same direction or in directions opposite to one another.

19. A method as claimed in claim 18, comprising directly closing at least a first one of said closing elements in the same grouping and indirectly displacing at least one second closing element in the same grouping by contact with said at least one first closing element.

20. A method as claimed in claim 17, wherein at least one of the groupings comprises at least three of said closing elements, and in an open condition of at least a portion of said opening, at least three of said closing elements are positioned essentially completely over one another in a parallel overlapping relationship.

21. A method as claimed in claim 17, comprising selectively opening and closing at least two separate sub-areas of said opening that are and remain separated from one another by a closed region having a width of at least the width of one of said closing elements, by selectively displacing a plurality of said closing elements, in the same or different groupings, parallel to one another in essentially said single plane.

* * * * *